(12) United States Patent
Katzir

(10) Patent No.: US 12,171,169 B2
(45) Date of Patent: Dec. 24, 2024

(54) PEST REPELLING DRIP IRRIGATION PIPE

(71) Applicant: RIVULIS PLASTRO LTD., Kibbutz Gvat (IL)

(72) Inventor: Tomer Katzir, Kibbutz Sarid (IL)

(73) Assignee: RIVULIS PLASTRO LTD., Kibbutz Gvat (IL)

( * ) Notice: Subject to any disclaimer, the term of this patent is extended or adjusted under 35 U.S.C. 154(b) by 511 days.

(21) Appl. No.: 16/645,292

(22) PCT Filed: Sep. 6, 2018

(86) PCT No.: PCT/IL2018/050996
§ 371 (c)(1),
(2) Date: Mar. 6, 2020

(87) PCT Pub. No.: WO2019/049139
PCT Pub. Date: Mar. 14, 2019

(65) Prior Publication Data
US 2020/0305364 A1    Oct. 1, 2020

(30) Foreign Application Priority Data

Sep. 7, 2017 (IL) .......................................... 254439

(51) Int. Cl.
| | |
|---|---|
| A01G 25/02 | (2006.01) |
| A01N 53/00 | (2006.01) |
| B29C 48/00 | (2019.01) |
| B29C 48/09 | (2019.01) |
| B29C 48/18 | (2019.01) |
| B29K 23/00 | (2006.01) |
| B29L 23/00 | (2006.01) |
| B29L 31/00 | (2006.01) |

(52) U.S. Cl.
CPC ............. *A01G 25/02* (2013.01); *A01N 53/00* (2013.01); *B29C 48/022* (2019.02); *B29C 48/09* (2019.02); *B29C 48/18* (2019.02); *B29K 2023/0633* (2013.01); *B29K 2023/065* (2013.01); *B29L 2023/22* (2013.01); *B29L 2031/70* (2013.01)

(58) Field of Classification Search
None
See application file for complete search history.

(56) References Cited

U.S. PATENT DOCUMENTS

| | | |
|---|---|---|
| 4,095,618 A | 6/1978 | Spencer |
| 4,680,328 A | 7/1987 | Dohrer |
| 5,591,293 A | 1/1997 | Miller |

(Continued)

FOREIGN PATENT DOCUMENTS

| | | |
|---|---|---|
| CN | 1502653 A | 6/2004 |
| CN | 104650439 A | 5/2015 |

(Continued)

OTHER PUBLICATIONS

Shizuto (JP-2011127018 (Machine Translation provided)) (Year: 2011).*

(Continued)

*Primary Examiner* — Robert J Grun
(74) *Attorney, Agent, or Firm* — Rodney J. Fuller; BOOTH UDALL FULLER, PLC

(57) ABSTRACT

A drip irrigation lateral comprising a water conduit manufactured of a polymeric composition comprising pyrethroid.

20 Claims, 1 Drawing Sheet

(56) References Cited

U.S. PATENT DOCUMENTS

| | | |
|---|---|---|
| 2004/0247635 A1 | 12/2004 | Igarashi |
| 2011/0165213 A1 | 7/2011 | Vestergaard Frandsen |
| 2013/0334334 A1 | 12/2013 | Legari |
| 2017/0035044 A1 | 2/2017 | Ruskin |

FOREIGN PATENT DOCUMENTS

| | | |
|---|---|---|
| CN | 104788783 A | 7/2015 |
| CN | 105218971 A | 1/2016 |
| EP | 0857750 A1 | 8/1998 |
| GB | 2302542 A | 1/1997 |
| JP | H08302080 A | 11/1996 |
| JP | 2000302613 A | 10/2000 |
| JP | 2001279033 A | 10/2001 |
| JP | 2011127018 A | 6/2011 |
| WO | 0234487 A1 | 5/2002 |
| WO | 2008004711 A2 | 1/2008 |
| WO | 2009080464 A2 | 7/2009 |
| WO | 2010015256 A2 | 2/2010 |
| WO | 2011145667 A1 | 11/2011 |
| WO | 2017027269 A1 | 2/2017 |
| WO | 2017033627 A1 | 3/2017 |

OTHER PUBLICATIONS

Anti-rodent polyethylene pipes. Semnan Polyethylene. [Retrieved on Dec. 10, 2018]. Retrieved from http://www.semnanpe.com/en/shownews.php?idshow=948&idfield=0. Dec. 10, 2018 (Dec. 10, 2018). 2 pages.

Smock, D. Chemical additive protects plastics from rats. Design News, Materials & Assembly, Automotive Jul. 25, 2011. [Retrieved on Dec. 10, 2018]. Retrieved from https://www.designnews.com/materials-assembly/chemical-additive-protects-plastics-rats/194932118938829. Jul. 25, 2011 (Jul. 25, 2011). 5 pages.

Liu et al., (2008) Enantioselective cytotoxicity of the insecticide bifenthrin on a human amnion epithelial (FL) cell line. Toxicology 253(1-3): 89-96.

Video clip posted on YouTube. 2016. Inline Drip pipe machine by Automatic Systems Jalgaon Mob. 09923279747. Plant for producing by extrusion inside dripper drip irrigation pipe. Retrieved from: https://www.youtube.com/watch?v=qhJXR81h7Vg&t=125s on Jul. 26, 2023. 3 pages.

Video clip posted on YouTube. 2017. Drip Manufacturing Process. Plant for producing by extrusion inside dripper drip irrigation pipe. Retrieved from: https://www.youtube.com/watch?v=h3t6AIQBI7o on Jul. 26, 2023. 2 pages.

Video clip posted on YouTube. 2016. Cylindrical drip irrigation pipe production line. Plant for producing by extrusion inside dripper drip irrigation pipe. Retrieved from: https://www.youtube.com/watch?v=z7_r_D6HXL4 on Jul. 26, 2023. 2 pages.

Video clip posted on YouTube. 2015. Sarem Flat Drip Irrigation Pipe Production Lines. Plant for producing by extrusion inside dripper drip irrigation pipe. Retrieved from: https://www.youtube.com/watch?v=KeUJPOGZ6lw on Jul. 26, 2023. 2 pages.

Video clip posted on YouTube. 2015. DRTS—Nano Drip Irrigation Pipe Production Line. Plant for producing by extrusion inside dripper drip irrigation pipe. Retrieved from: https://www.youtube.com/watch?v=nyJXxTs4saU on Jul. 26, 2023. 2 pages.

* cited by examiner

PEST REPELLING DRIP IRRIGATION PIPE

CROSS-REFERENCE TO RELATED APPLICATIONS

This application is the U.S. National Stage of International Application No. PCT/IL2018/050996, filed on Sep. 6, 2018, which claims the benefit of and priority to Israeli Application No. 254439, filed on Sep. 7, 2017, the contents of each of which are hereby incorporated by reference in their entireties.

FIELD OF THE INVENTION

The present invention relates to the field of drip irrigation and watering of agricultural fields. Specifically, the present invention provides a pest repellent composition for the production of drip irrigation pipe and a process for the production of such pipes.

BACKGROUND OF THE INVENTION

Drip irrigation systems include perforated pipes that allow water to drip slowly to the roots of plants in agricultural fields. The pipe either are located above the soil surface or buried below the surface. In both cases, it is known that such pipes suffer from attraction of pests, such as rodents and insects, thereto. Such attraction is facilitated by the presence of dripping water and results in damages to the pipeline due to scratching, gnawing and nibbling of different families of pests in search of water. Generally, the level of damage and rate of deterioration of the pipes are determined by environmental factors, such as climate, type of crops and types of pests residing in the field; as well as by mechanical factors, such as the composition and thickness of the pipe.

As of today, the prevalent practice in confronting pest-induced dripper line deterioration uses pesticides and pest repellents, which are either sprayed by aerial application or delivered to the ground through the irrigation system. Examples of such repellants are RODREPEL, REPELLEX, Mocap (Amvac-Chemical Corporation), Vydate (DuPont), Diazinon (Ciba-Geigy) and Mospilan (Genera).

US 2013/0334334 discloses a chemical mixture intended to reduce damage to buried lines and discharge components of a subsurface drip irrigation system from rodents that may otherwise bite through these components. The chemical mixture comprises a liquid base, a surfactant, a dye and an odor-producing chemical, preferably methyl mercaptan. The system and method of injecting the chemical mixture into the distribution lines of the drip irrigation system so that the mixture flows into the soil with the irrigation water. The methyl mercaptan binds with the soil, creating an odor that disrupts the life cycle of rodents.

As the harmful pesticides and repellents, which are spread over agricultural fields, may wind up with the end consumer of the agricultural product, alternative approaches are constantly being developed. For example, it was suggested to increase the durability of pipes through modification of the mechanical properties of the pipes. Accordingly, it has been shown that damage by pests on small diameter plastic pipes is determined by the hardness of the pipe. For example, polyethylene and flexible polyvinylchloride (PVC) pipe is more prone to damage than rigid PVC pipes, and high-density polyethylene pipes are less likely to be damaged than low-density polyethylene pipes.

WO/2017/027269 discloses an irrigation tube having silica or iron oxide particles uniformly dispersed throughout the inner portion and the outer portion of the tube.

Another approach is to include a rodent deterrent as a part of the irrigation apparatus. U.S. Pat. No. 4,095,618 discloses a rodent deterrent irrigation tube, comprising (a) a tube member; (b) webs extending laterally beyond diametrically opposite margins of the tube member and forming rodent barriers of sufficient width to prevent biting contact across the web into the tube member; and (c) a rodent deterrent disposed within and confined to the remote margins of the webs.

There remains an unmet need for durable pest repelling drip irrigation systems.

Meanwhile, pyrethroid is an organic compound similar to the natural pyrethrins produced by the flowers of pyrethrums (Chrysanthemum cinerariaefolium and C. coccineum). Pyrethroids constitute the majority of commercial household insecticides. In the concentrations used in such products, they may also have insect repellent properties and are generally harmless to humans.

Within the pyrethroid group of known materials, Bifenthrin is a known Pyrethroid insecticide used primarily against the red imported fire ant by influencing its nervous system. It is impregnated in bednets to repel malaria-causing mosquitos and in banana bags to deter pests. Products containing bifenthrin include Transport, Talstar, Maxxthor, Capture, Brigade, Bifenthrine, Ortho Home Defense Max, Bifen XTS, Bifen IT, Bifen L/P, Torant, Zipak, Scotts LawnPro Step 3, Wisdom TC Flowable, FMC 54800, Allectus, Ortho Max Pro and OMS3024 and mega wash from green planet. Another type of material that belongs to the pyrethroid group is Deltamethrin. Deltamethrin is a pyrethroid ester insecticide. This material too is a member of other pesticides called synthetic pyrethroid and it is sold as DeltaGard in Canada.

SUMMARY OF THE INVENTION

The present invention provides a drip irrigation lateral comprising a water conduit (e.g. an extruded seamless pipe, a tubular pipe manufactured from a foldable sheet, etc.) manufactured of a polymeric composition comprising Pyrethroid (e.g.—bifenthrin or deltamethrin). The pest repellent properties of Pyrethroid impart to the water conduit protection from pests and subsequently improved durability in the drip irrigation lateral's environment, i.e. in agricultural fields.

In one aspect, the invention is materialized as a drip irrigation lateral comprising a water conduit manufactured of a polymeric composition comprising pyrethroid.

In a preferred embodiment, the pyrethroid is either bifenthrin or deltamethrin.

In another preferred embodiment of the invention, the lateral is either an integral (in-line) drip irrigation type lateral wherein a plurality of emitters are attached to an inner circumference of the conduit in a spaced relationship; an external (on-line) drip irrigation type lateral wherein a plurality of emitters are attached to the external circumference of the conduit in a spaced relationship; an integral strip type drip irrigation lateral wherein a continues strip of emitters is attached either to an inner circumference of the conduit or to the seam area of the pipe (in case it is manufactured by folding a sheet into a pipe); or a drip irrigation lateral of the type wherein the emitters are either attached to or formed at (e.g.—by embossing or vacuum forming) the seam area of a conduit formed by folding a sheet into a pipe.

In yet another aspect of the invention, the invention provides a rather general method (process) of manufacturing an integral drip irrigation lateral. The method comprising the steps of: forming a seamless tubular pipe by extruding a mixture comprising polyethylene and Pyrethroid (e.g.—bifenthrin or deltamethrin) for at least forming the external circumference of the pipe; positioning a plurality of emitters in an inner circumference of the pipe at a spaced relationship along the length thereof; and forming a plurality of outlets in the pipe at a spaced relationship along the length thereof such that an emitter is positioned over an outlet.

In yet another aspect of the invention, the invention provides a rather general method (process) of manufacturing a drip irrigation lateral. The method comprising the steps of: forming a tubular pipe by film blowing process while extruding a mixture comprising polyethylene and Pyrethroid (e.g.—bifenthrin or deltamethrin) for at least forming the external circumference of the pipe; and forming a plurality of emitters at the seam area of the pipe.

In yet another aspect of the invention, the invention provides a new use of Pyrethroid (e.g.—bifenthrin or deltamethrin), as a pest repellent in polymeric compositions implemented in the manufacturing of water conduits of drip irrigation laterals.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

FIG. 1 is a graph of total insect damages found in a field experiment after 4 months in a pest repellent drip irrigation lateral (right) vs. reference lateral (left).

FIG. 2 is a graph of meters per insect damages found in the same field experiment from which the graph of FIG. 1 was taken from.

DETAILED DESCRIPTION OF THE INVENTION

Drip irrigation is a method of crop irrigation that involves a controlled delivery of water to plants through system of pipes, valves, tubing and emitters. The water is delivered from a source directly to the root zone of individual plants or to the surface of the soil. Water drips constantly onto plants to keep them well watered. This method of irrigation is used to automate aspects of plant care and to save water by delivering water directly to the plant's roots, as opposed to spraying water and having water miss the area where it is most required, thus wasting it.

Generally, drip irrigation systems comprise a source of water connected to a water conduit (pipe) having outlets and emitters (drippers), which enable controlled dripping of irrigation water to a designated place at a predetermined rate. The term "drip irrigation lateral" as used herein refers to an irrigation system comprising a water conduit (pipe).

The present invention relates to polyethylene based water conduit implemented in drip irrigation laterals that are rodent, worm and insect repellant. The water conduit part of the lateral (namely—the pipe section that may be manufactured by extrusion process as a seamless tubular pipe or formed as such from a foldable sheet attached in an elongated seam), is rodent, worm and insect resistant owing to the addition of a pest repelling material into the base polymeric material that formed at least the external circumference of the pipe. The pest repelling material is incorporated during the manufacture of the pipe, thereby deterring damage caused by pests.

Surprisingly, it was found that the incorporation of the chemical pyrethroid (e.g.—bifenthrin or deltamethrin), effectively eliminates pest-induced damages to drip irrigation laterals. Furthermore, it is illustrated how in case the lateral is of the integral drip irrigation type (the type in which a plurality of emitters are attached to an inner circumference part of the conduit in a spaced relationship and said conduit is formed as a seamless tubular pipe by extrusion process), bifenthrin is incorporated to polyethylene pipes during the extrusion process of the pipe, through maintaining its pest repelling properties.

The application of pyrethroid (e.g.—bifenthrin or deltamethrin), can be used to deter a wide range of pests from very small insects to large rodents from damaging drip irrigation laterals. If a pest approaches a polyethylene made water conduit of the lateral that is protected through the incorporation of pyrethroid, the pest will be deterred upon sensing said pest deterring molecule.

For example—bifenthrin is a synthetic, broad-spectrum, pyrethroid insecticide and acaricide having the formula I. Bifenthrin is poorly soluble in water and often remains in soil after usage. Its residual half-life in soil is between 7 days and 8 months, depending on the soil type. It is a white, waxy solid with a faint sweet smell. It is chemically synthesized in various forms, including powder, granules and pellets. However, it is not naturally occurring. Like other pyrethroids, bifenthrin is chiral; it has different enantiomers which can have different biological effects. Bifenthrin is found in two enantiomers: 1S-cis-bifenthrin ((2-methyl-[1,1'-biphenyl]-3-yl)methyl (1S,3S)-3-((Z)-2-chloro-3,3,3-trifluoroprop-1-en-1-yl)-2,2-dimethylcyclopropane-1-carboxylate) and 1R-cis-bifenthrin ((2-methyl-[1,1'-biphenyl]-3-yl)methyl (1R,3R)-3-((Z)-2-chloro-3,3,3-trifluoroprop-1-en-1-yl)-2,2-dimethylcyclopropane-1-carboxylate). 1S-cis-Bifenthrin was found to be 3-4 times more toxic to humans than 1R-cis-bifenthrin, while the latter is more than 300 times more effective as a pesticide. As detailed below, bifenthrin is commercial as a masterbatch mixture, which includes about 10% bifenthrin. Such masterbatch products may be conveniently incorporated into polyethylene extrusion mixtures. This Additive is already used today in plastic bags for grain storage and in agriculture films.

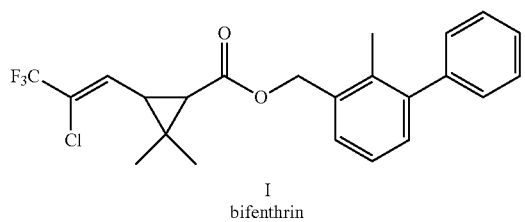

I
bifenthrin

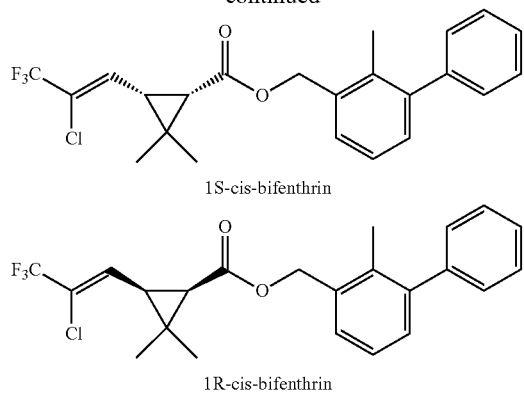

1S-cis-bifenthrin 1R-cis-bifenthrin

Bifenthrin, as used herein, unless specified otherwise, refers to 1S-cis-bifenthrin, 1R-cis-bifenthrin or to a combination of both. In some embodiments the bifenthrin is 2-methyl-[1,1'-biphenyl]-3-yl)methyl (1S,3S)-3-((Z)-2-chloro-3,3,3-trifluoroprop-1-en-1-yl)-2,2-dimethylcyclopropane-1-carboxylate). In some embodiments the bifenthrin comprises 2-methyl-[1,1'-biphenyl]-3-yl)methyl (1S, 3S)-3-((Z)-2-chloro-3,3,3-trifluoroprop-1-en-1-yl)-2,2-dimethylcyclopropane-1-carboxylate). In some embodiments the bifenthrin is 2-methyl-[1,1'-biphenyl]-3-yl)methyl (1R,3R)-3-((Z)-2-chloro-3,3,3-trifluoroprop-1-en-1-yl)-2,2-dimethylcyclopropane-1-carboxylate). In some embodiments the bifenthrin comprises 2-methyl-[1,1'-biphenyl]-3-yl)methyl (1R, 3R)-3-((Z)-2-chloro-3,3,3-trifluoroprop-1-en-1-yl)-2,2-dimethylcyclopropane-1-carboxylate).

In some embodiments, the water conduit (pipe) comprises bifenthrin in the range of 0.05% to 5.0% w/w based on the total weight of the conduit. In some embodiments, the conduit comprises bifenthrin in the range of 0.1% to 3.0% w/w based on the total weight of the conduit. In some embodiments, the conduit comprises bifenthrin in the range of 0.2% to 2.0% w/w based on the total weight of the conduit. In some embodiments, the conduit comprises bifenthrin in the range of 0.25% to 1.5% w/w based on the total weight of the conduit. In some embodiments, the conduit comprises bifenthrin in the range of 0.2% to 1.0% w/w based on the total weight of the conduit.

Generally, the amount of Pyrethroid (e.g.—bifenthrin or deltamethrin), is determined such that it protects the water conduit (pipe) against pest damage, such as insects bites and nibbles. The dosing of Pyrethroid may be minimalized so it will only repel the pests rather than exterminating them. Moreover, the amount used for deterring pests is not defined as dangerous at these quantities.

In some embodiments, the Pyrethroid is uniformly dispersed within the conduit.

In some embodiments, the composition comprising Pyrethroid further comprises polyethylene.

Water conduits that are implemented in drip irrigation laterals are commonly based on polyethylene plastics. The exact polymeric composition may be determined based on the desired physical properties, such as elasticity and rigidity of the lateral. Two polyethylene types commonly used as raw material for the formation of polyethylene water conduits are HDPE (high density Polyethylene) and LDPE (low density Polyethylene), of which LLDPE (linear low density Polyethylene) is sometimes preferred.

In some embodiments, the polyethylene comprises HDPE. In some embodiments, the polyethylene comprises LDPE. In some embodiments, the polyethylene comprises HDPE and LDPE. In some embodiments, the polyethylene consists of HDPE and LDPE. In some embodiments, the LDPE comprises LLDPE. In some embodiments, the LDPE is LLDPE.

In some embodiments, the polymeric composition comprising Pyrethroid further comprises a color masterbatch. In some embodiments, the polymeric composition comprising Pyrethroid further comprises black master batch. The term "color masterbatch" as used herein refers to a class of compositions, which impart color to polymer articles. Non-limiting examples of color masterbatch (MB) in accordance with the present disclosure include compositions, which include as coloring material carbon black, titanium dioxide ($TiO_2$), zinc disulfide ($ZnS_2$) and zinc oxide (ZnO), The color master batch may be chosen depending upon the desired color to be imparted to the composition. For examples, white polymeric products may include white masterbatch comprising titanium dioxide, whereas black polymeric products may include black masterbatch comprising carbon black. Other than the coloring material color masterbatch composition commonly include carrier material. The carriers are intended to improve the processability and inter-miscibility of the masterbatch within the composition to be colored. Masterbatches especially compatible with the drip irrigation pipe disclosed herein include carriers, such as polyethylene carriers, which have good miscibility with plastics.

The term "black masterbatch" as used herein refers to a color masterbatch having a black color. Specifically, black masterbatch compositions typically include carbon black for coloring and a carrier, such as polyethylene carrier.

As mentioned above, drip irrigation systems comprise a source of water connected to a conduit having outlets and emitters, which enable controlled dripping of irrigation water to a designated target at a predetermined rate. Therefore, it is preferable that the outlets extend through the pipe in a spaced relationship along a length of the pipe. In some embodiments the outlets extend through the pipe in a spaced relationship along a length of the pipe and the emitters are attached to the inner circumference part of the pipe in a spaced relationship, such that an emitter is positioned over an outlet (the type of drip irrigation laterals commonly known as "integral drip irrigation" or "in-line") and said conduit is formed as a seamless tubular pipe by extrusion process of said composition comprising bifenthrin.

Generally, the extrusion is executed at a temperature in the range of 150° C. to 280° C. and at a pressure in the range of 200 to 400 Bar. Relatively thin pipes may be used, which is both economic and environmentally friendly. Thin (100-500 micrometer or about 5-18 mils) pipes are commonly referred to as 'tapes'. Mil is a unit of length in an inch-based system, which is equal to 0.001 inches or 25.4 micron in the metric system. By thin (about 5-18 mils) pipes, it is meant that the walls of the pipes have thicknesses of about 5-18 mils.

When incorporating the Pyrethroid (e.g.—bifenthrin or deltamethrin) as an active material in the mixture for extrusion, the resulting pipe is typically formed such that the active material is uniformly dispersed within the pipe. Thus, the active material may be detained in the plastic matrix of the product and is slowly released to the environment of the pipe after establishing the irrigation infrastructure.

For example—bifenthrin is commercial as a masterbatch mixture, which includes bifenthrin and a carrier(s). In such masterbatch mixtures, the active substance is stable and is finely dispersed in the polymer matrix carrier. Bifenthrin has poor water solubility, and it is used in agricultural applications to protect cultivated plants. Once in soil, it is biodegradable and biodegrades in a short period of time. Such masterbatch mixtures are employed in the manufacture of plastic bags for grain and banana storage and in agriculture films. Preferably, the carrier of the bifenthrin masterbatch used for preparing the pipe of the invention is inter-miscible with polyethylene, such that a substantially homogenous product is formed.

In some embodiments there is provided a process of manufacturing an integral drip irrigation lateral, the process comprises the steps of: forming a seamless tubular pipe by extruding a mixture comprising polyethylene and bifenthrin; positioning a plurality of emitters in an inner circumference of the pipe at a spaced relationship along the length thereof; and forming a plurality of outlets in the pipe at a spaced relationship along the length thereof, such that an emitter is positioned over an outlet.

The following examples are presented in order to more fully illustrate certain embodiments of the invention. They should in no way, however, be construed as limiting the broad scope of the invention. One skilled in the art can readily devise many variations and modifications of the principles disclosed herein without departing from the scope of the invention.

Example 1—Manufacture of a Pest Repellent Drip Irrigation Pipe

Example 1A: Composition of Starting Materials

An exemplary mixture for extrusion is given in Table 1:

TABLE 1 composition of a mixture for extrusion:

| Component | Weight percentage |
| --- | --- |
| HDPE | 40% |
| LLDPE | 50% |
| Black masterbatch | 5% |
| Bifenthrin masterbatch | 5% |

The bifenthrin masterbatch was purchased from Symphony Environmental. The masterbatch contains up to about 10% bifenthrin (CAS 82657-04-3) (w/w), about 50% calcium carbonate (CAS 471-34-1) and about 40% 1-Butene, polymer with ethene (CAS 25087-34-7). The masterbatch has melting range of 119-128° C. and density of 1.23 gr/cm$^3$.

Example 1B: Manufacture of a Drip Irrigation Pipe

The composition of Table 1 was fed into an extruder. The mixture was heated and melted at 240° C. and 300 Bar in the extruder. The molten mixture was extruded and at the exiting end of the extruder crosshead, the material was shaped in the form of a tubular seamless pipe in a calibrator and cooling bath at vacuum. During the extrusion, emitters were fed through the extruder crosshead and were positioned inside the pipe through welding. The emitters were D1000 type of emitters of the applicant, having flow rates of 1000 ml/hr. The formed pipe were 16 mm in diameter and 200 micrometer thickness.

Example 2—Field Test for Pest Repellent Drip Irrigation Pipe

Pest repellent drip irrigation pipes were manufacture in accordance with the process described in Example 1 (117,000 meters) and were installed in agricultural fields in Italy. The fields where the pest repellent drip irrigation pipes were installed are used for growing tomatoes and sugar beet crops. The following pests were found to reside in the fields: earwigs, wireworms, mole crickets, black beetles, white grubs, red ants, millipedes and caterpillars. Another 117,000 meters of reference drip irrigation pipes were manufactured and installed. The manufacture of the reference pipes used the composition of Table 1, but without the bifenthrin masterbatch component.

The pest repellent pipes and reference pipes were examined for pest damages and mechanical damages at the end of the four months of the irrigation season. The number of damages were counted and are provided in Table 2.

TABLE 2 damage abundance in pest repellent drip irrigation tube vs. reference

| | Pest repellent pipe[1] | Reference pipe[2] |
| --- | --- | --- |
| Length (meters) | 117622 | 116989 |
| No. of mechanical/other damages | 93 | 105 |
| No. of insect damages | 14 | 827 |
| Meters per insect damage | 8402 | 126 |
| Total damages | 107 | 932 |
| Meters per damage. | 1099 | 141 |

[1] Pest repellent drip irrigation pipe with bifenthrin.
[2] Reference drip irrigation pipe without bifenthrin.

Figures 1, 2:
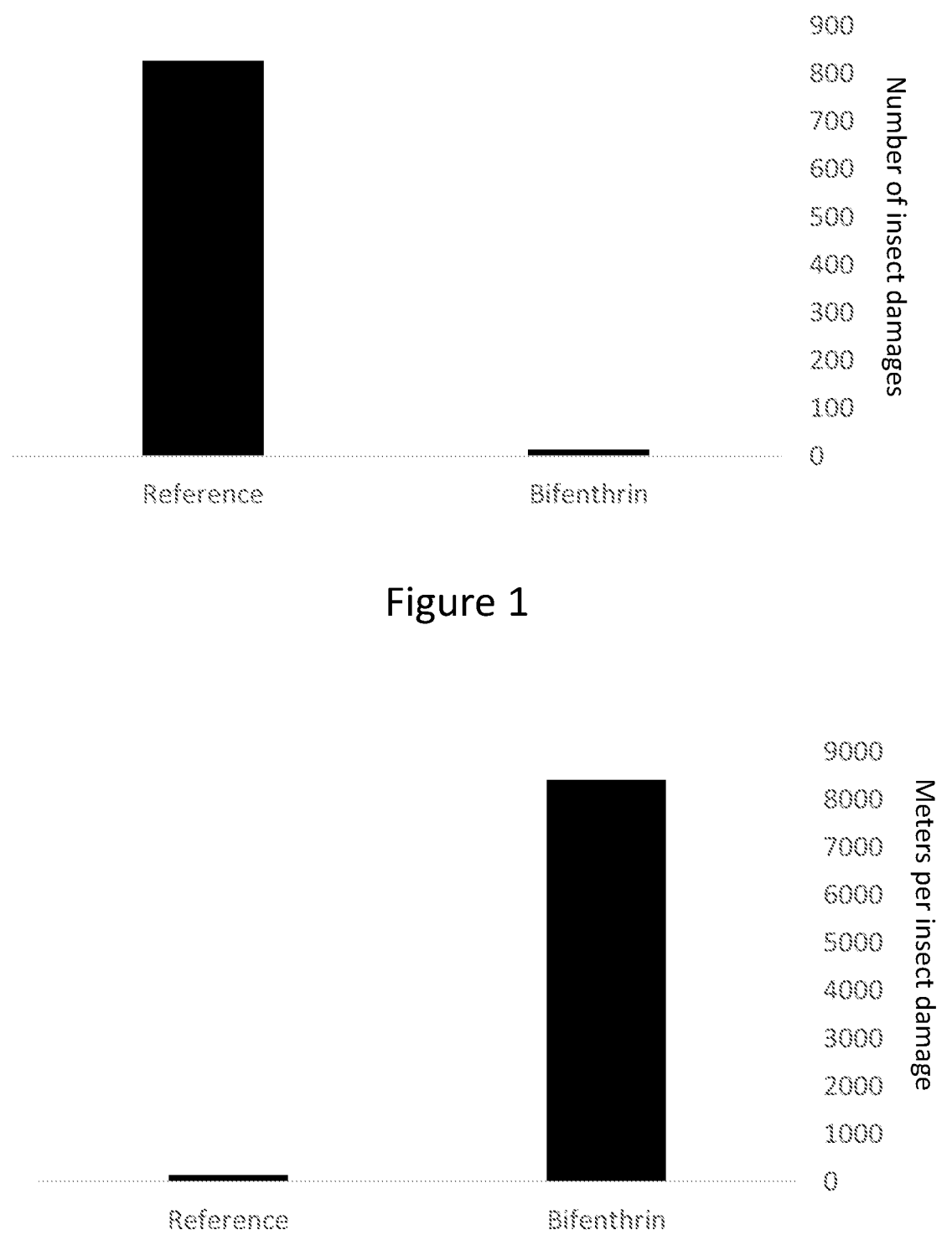

The results of the experiment clearly indicate that the total number of damages was decreased through the incorporation of bifenthrin into the composition of the drip irrigation pipe. Specifically, the total number of damages was significantly decreased from a damage every 141 meters in the reference pipe to a single damage every 1099 meters in the pest repellent pipe, which is an 8-fold decrease in the total number of damages. Moreover, when subtracting mechanical and other damages, such as damages resulting from bird pecking, the ratio is even higher. Thus, the number of insect induced damages was significantly decreased from a damage every 126 meters in the reference pipe to a single damage every 8402 meters in the pest repellent pipe, which is about 60-fold decrease in the number of insect induced damages to the pipe. FIG. 1 is a graph showing total insect damages found in the experiment in the pest repellent drip irrigation pipe (right) vs. the reference pipe (left) FIG. 2 is a graph showing the meters per insect damages found in the experiment in the pest repellent drip irrigation pipe (right) vs. the reference pipe (left).

The invention which is the subject matter of this application was described hereinabove while referring to an integral (in-line) drip irrigation type lateral wherein a plurality of emitters are attached to an inner circumference of the conduit in a spaced relationship, and while the conduit is manufactured by extrusion of a polymeric composition comprising bifenthrin as the type of pyrethroid implemented, as a one layer homogenous pipe.

Nevertheless, any man skilled in the art will understand that other manufacturing technique and pyrethroid type of materials can be utilized in order to provide pest repelling drip irrigation pipe in accordance with the invention.

For example an external (on-line) drip irrigation type lateral wherein a plurality of emitters are attached to the external circumference of the conduit in a spaced relationship; an integral strip type drip irrigation lateral wherein a continues strip of emitters is attached either to an inner circumference of the conduit or to the seam area of the pipe (in case it is manufactured by folding a sheet into a pipe); or a drip irrigation lateral of the type wherein the emitters are either attached to or formed at (e.g.—by embossing or vacuum forming) the seam area of a conduit formed by folding a sheet into a pipe.

Without limiting the generality of the above, the pyrethroid can be implemented in the external layer of a multi-layer water conduit manufactured either by co-extrusion process or through a blown film (or cast film) process. The pyrethroid will be applied therefore, only in the pest exposed area of the conduit and thus reduce the manufacturing costs.

The following examples are presented in order to more fully illustrate certain embodiments of the invention as implemented in a multi-layer type of drip irrigation conduit. They should in no way, however, be construed as limiting the broad scope of the invention. One skilled in the art can readily devise many variations and modifications of the principles disclosed herein without departing from the scope of the invention.

Example 3—Manufacture of a Pest Repellent Drip Irrigation Pipe by Co-Extrusion

|  | Extruder | HDPE (weight percentage) | LLDPE (Weight percentage) | Black masterbatch (Weight percentage) | Insect repellent (pyrethroid) masterbatch (weight percentage) |
|---|---|---|---|---|---|
| External layer | A | 30% | 60% | 5% | 5% |
| Internal layer | B | 35% | 65% | — | — |

Example 4—Manufacture of a Pest Repellent Drip Irrigation Pipe by Blown Film (or Cast Film)

|  | Extruder | HDPE (weight percentage) | LLDPE (Weight percentage) | Black masterbatch (Weight percentage) | Insect repellent (pyrethroid) masterbatch (weight percentage) |
|---|---|---|---|---|---|
| External layer | A | — | 90% | 5% | 5% |
| Mid-layer | B | 95% | — | 5% | — |
| Internal layer | C | — | 95% | 5% | — |

Wherein for example, following the blown film or cast film process the multi-layers sheet (three in the above example), as this sheet is provided following the nip rolls stage of the blown film line, is for example, cut into elongated strips and each strip is then folded into a pipe formation, while the emitter mechanism (e.g.—the water inlet, the water pressure reducing labyrinth and the water outlet) is formed for example, by embossing process (or another example—by vacuum forming process), at the seam area of the folded strip (and thereafter the water outlet is formed).

All references cited herein are hereby expressly incorporated by reference in their entirety. While certain embodiments of the invention have been illustrated and described, it is to be clear that the invention is not limited to the embodiments described herein. Numerous modifications, changes, variations, substitutions and equivalents will be apparent to those skilled in the art without departing from the spirit and scope of the present invention as described by the claims, which follow.

The invention claimed is:

1. A drip irrigation lateral comprising a water conduit manufactured of a polymeric composition comprising pyrethroid;
   wherein the lateral is an integral drip irrigation lateral having a plurality of emitters attached to an inner circumference of the conduit in a spaced relationship, and said conduit is formed as a seamless tubular pipe by extrusion process of said composition comprising pyrethroid;
   wherein said composition further comprises polyethylene selected from HDPE, LDPE and a combination thereof.

2. The drip irrigation lateral according to claim 1, wherein the pyrethroid is bifenthrin.

3. The drip irrigation lateral according to claim 1, wherein the pyrethroid is deltamethrin.

4. The drip irrigation lateral according to claim 2, wherein the bifenthrin is (2-Methyl-3-phenylphenyl) methyl (1S,3S)-3-[(Z)-2-chloro-3,3,3-trifluoroprop-1-enyl]-2,2-dimethylcyclopropane-1-carboxylate.

5. The drip irrigation lateral according to claim 2, wherein the weight of the bifenthrin is in the range of 0.1% to 3.0% based on the total weight of the water conduit.

6. The drip irrigation lateral according to claim 1, wherein the composition further comprises a color masterbatch.

7. A process of manufacturing an integral drip irrigation lateral comprising the step of:
   forming a seamless tubular pipe by extruding a mixture comprising polyethylene and pyrethroid;
   positioning a plurality of emitters in an inner circumference of the pipe at a spaced relationship along the length thereof, and forming a plurality of outlets in the pipe at a spaced relationship along the length thereof such that an emitter is positioned over an outlet.

8. The process according to claim 7, wherein the step of extruding the mixture is performed at a temperature in the range of 150° C. to 280° C. and a pressure in the range of 200 to 400 Bar.

9. The drip irrigation lateral according to claim 1, wherein the conduit part of the lateral is multi-layer and said polymeric composition comprising pyrethroid is utilized in the manufacturing of at least the external layer of the conduit.

10. The drip irrigation lateral according to claim 9, wherein the multi-layer conduit is manufactured through co-extrusion or blown film process.

11. The process of manufacturing a drip irrigation lateral according to claim 7, wherein when the pyrethroid is deltamethrin the extrusion is executed at a temperature in the range of 150° C. to 280° C. and a pressure in the range of 200 to 400 Bar.

12. The process of manufacturing a drip irrigation lateral according to claim 7, wherein the pyrethroid is bifenthrin and is provided as a masterbatch comprising bifenthrin and a carrier.

13. Use of pyrethroid as a pest repellent in a polymeric composition, which is implemented in the manufacturing of the water conduit of a drip irrigation lateral.

14. The drip irrigation lateral according to claim 1, wherein an amount of the pyrethroid in the composition is configured to repel pests without exterminating the pests.

15. The drip irrigation lateral according to claim 1, wherein the weight of the pyrethroid is in the range of 0.2% to 1.0% based on the total weight of the water conduit.

16. A drip irrigation lateral comprising a water conduit manufactured of a polymeric composition comprising pyrethroid and polyethylene;
- wherein the lateral is an integral drip irrigation lateral having a plurality of emitters attached to an inner circumference of the conduit in a spaced relationship, and said conduit is formed as a seamless tubular pipe by extrusion process of said composition comprising pyrethroid and polyethylene;
- wherein the weight of the pyrethroid is in the range of 0.1% to 3.0% based on the total weight of the water conduit.

17. The drip irrigation lateral according to claim 16, wherein the weight of the pyrethroid is in the range of 0.2% to 1.0% based on the total weight of the water conduit.

18. The drip irrigation lateral according to claim 16, wherein the pyrethroid is bifenthrin.

19. The drip irrigation lateral according to claim 16, wherein the pyrethroid is deltamethrin.

20. The drip irrigation lateral according to claim 16, wherein the pyrethroid is uniformly dispersed within the conduit.

\* \* \* \* \*